United States Patent
Nojima (10) Patent No.: US 7,339,803 B2
(45) Date of Patent: Mar. 4, 2008

(54) INVERTER BRIDGE SHORT-CIRCUIT PROTECTION SCHEME

(75) Inventor: Geraldo Nojima, Duluth, GA (US)

(73) Assignee: Eaton Corporation, Cleveland, OH (US)

( * ) Notice: Subject to any disclaimer, the term of this patent is extended or adjusted under 35 U.S.C. 154(b) by 258 days.

(21) Appl. No.: 10/558,951

(22) PCT Filed: Apr. 9, 2004

(86) PCT No.: PCT/US2004/009273

§ 371 (c)(1), (2), (4) Date: Dec. 2, 2005

(87) PCT Pub. No.: WO2005/109590

PCT Pub. Date: Nov. 17, 2005

(65) Prior Publication Data

US 2006/0245222 A1    Nov. 2, 2006

(51) Int. Cl.
*H02M 7/48* (2007.01)

(52) U.S. Cl. .......................... 363/37; 363/71; 363/65; 361/91.6

(58) Field of Classification Search ............ 363/34–41, 363/65, 68, 71, 95, 132, 98; 361/79, 91.06, 361/86, 91.01
See application file for complete search history.

(56) References Cited

U.S. PATENT DOCUMENTS

| | | | | |
|---|---|---|---|---|
| 4,730,150 A | * | 3/1988 | Lee et al. | 318/254 |
| 4,928,042 A | * | 5/1990 | Harms et al. | 318/254 |
| 4,947,100 A | * | 8/1990 | Dhyanchand et al. | 322/10 |
| 5,500,616 A | * | 3/1996 | Ochi | 327/310 |
| 5,625,545 A | * | 4/1997 | Hammond | 363/71 |
| 6,097,582 A | | 8/2000 | John et al. | |
| 6,101,109 A | | 8/2000 | Duba et al. | |
| 6,236,580 B1 | | 5/2001 | Aiello et al. | |
| 6,519,169 B1 | | 2/2003 | Asplund et al. | |

* cited by examiner

*Primary Examiner*—Rajnikant B. Patel
(74) *Attorney, Agent, or Firm*—Martin J. Moran (57) ABSTRACT

A fault handling system for short circuit recovery in three-phase multiple-level inverter bridges, used to drive inductive loads, to assure a proper sequence for turning-off switches in the inverter bridge. Switches are selected for use in the inverter bridge so that outer switches toward the most positive and most negative bus voltage levels of the inverter bridge have lower transconductances than inner switches closest to an output phase of the inverter bridge. Additionally, driver cards driving outer switches utilize lower magnitude excitation control signals than driver cards driving inner switches. Driver cards driving outer switches, when detecting desaturation of an on-state switch, are set to automatically command the outer switch to an off-state, whereas driver cards driving inner switches wait for instructions from a controller before taking action.

22 Claims, 7 Drawing Sheets

INVERTER BRIDGE SHORT-CIRCUIT PROTECTION SCHEME

BACKGROUND OF THE INVENTION

1. Field of the Invention

Fault handling in inverter bridges utilizing Insulated Gate Bipolar Transistors (IGBTs) and similar switching devices, such as inverter bridges utilized with three-phase AC motors.

2. Description of the Related Art

Inverter bridges provide controlled energy used to drive inductive loads. A plurality of switches within the inverter bridge are sequentially switched to vary the inverter bridge's output voltage. Typically, output is a three-phase alternating current voltage. For a general background description of inverter bridge topologies and switching schemes, PCT Publications WO 02/37654 A2 published 10 May 2002 and WO 2004/015851 A2 published 19 Feb. 2004 are incorporated herein by reference.

In conventional inverter bridges, fault conditions (short-circuits) can be characterized as falling into one of two categories. A first category is a Type I fault. Typically, a Type I fault is the result of a fault inside the drive (for example, an IGBT failure or an output fault with low inductance). As a result of the low impedance, the increase in current (di/dt) through the IGBT is high, such that the IGBT is forced to desaturate.

When a Type I fault is detected, the switches of the inverter bridge are sequentially commanded to an off-state. Because the switches are not saturated, the current decays slowly, causing no appreciable voltage spikes. Therefore, Type I faults for two-level inverter bridges are fairly easy to manage, and numerous methods are known in the art. However, in three-or-more (multiple) level inverter bridges, which have more than two IGBT switches involved in the fault current path, the desaturation sequence of IGBT switches becomes unpredictable, which may cause IGBT destruction.

A second category is a Type II fault, which is typically a fault external to an inverter bridge, such as a cable short-circuit or motor fault. The impedance in the circuit undergoing fault is typically high, resulting in the current through the IGBT rising slowly. The result is that the IGBT saturates under the Type II fault condition. A Type II fault may occur while a particular IGBT is already in saturation.

Under a Type II fault condition, the IGBT can be quickly turned off, when the IGBT is commanded to an off-state while in saturation. However, such switching while in saturation results in a voltage spike that may destroy the transistor. The voltage spike is due to a counter-electromotive force produced by the negative current di/dt times a leakage inductance of the circuit. Under a Type II fault, the currents rise to levels several times higher than the rated nominal current of the IGBT.

A Type II short-circuit fault is the worst case for an inverter bridge, particularly in a multi-level inverter bridge, because it allows the IGBT to saturate during a fault condition. Type II faults involve a short-circuit path inductance which causes a limited di/dt current increase, which will allow the current to rise well above the maximum rated current of the IGBT, but will not allow the IGBT to enter desaturation. Adding additional circuitry to an inverter bridge to cut off power to the inductive load, without commanding off the IGBTs, as a practical matter, increases the leakage inductance of the inverter bridge circuit, thereby causing otherwise innocuous current switching di/dts to generate harmful voltage spikes. In comparison, if the switches are commanded off during a Type II fault and the fault current rises above the maximum rated current of the IGBT, then the IGBT will most likely be destroyed by the voltage spike generated by the negative current di/dt.

Figure 1:
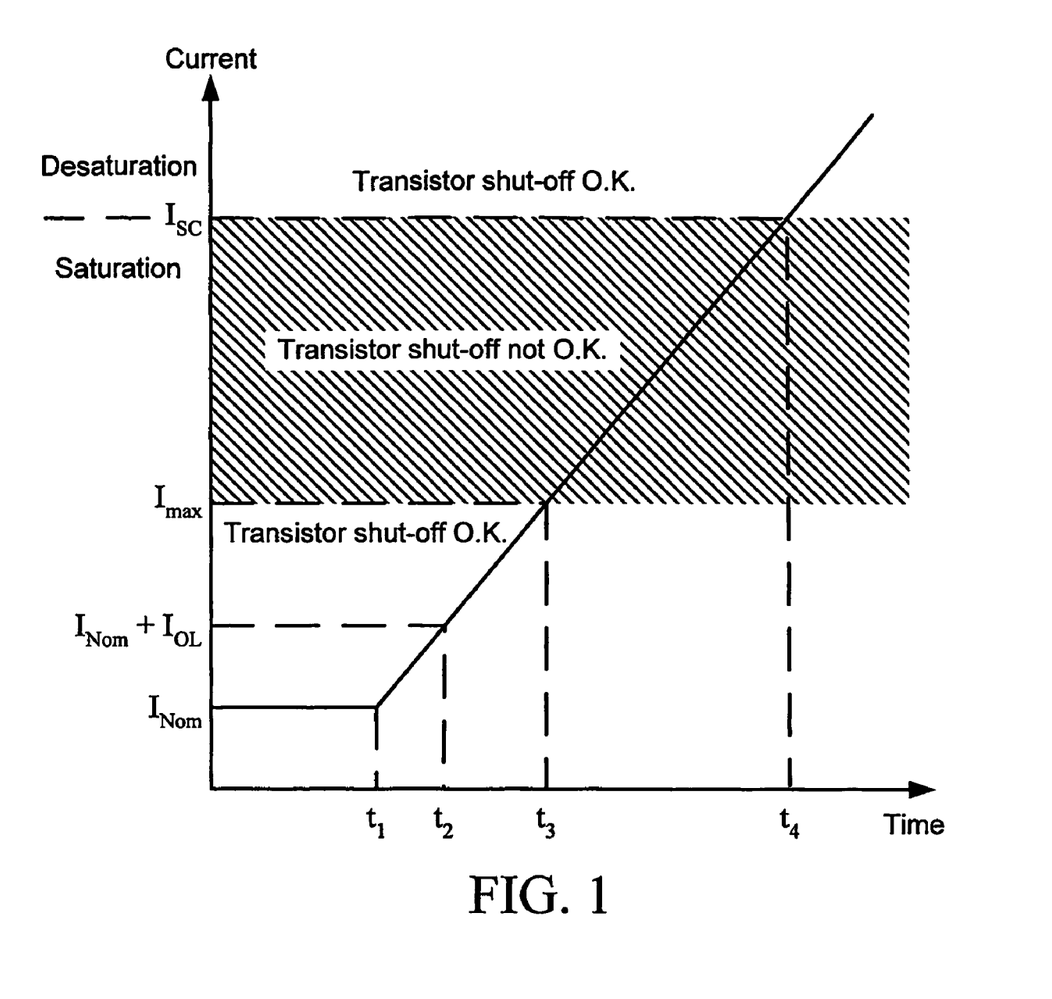
FIG. 1 is a current-time graph illustrating a change in current over time during a Type II fault.

As shown in FIG. 1, at the initiation ($t_1$) of a Type II fault, current rises slowly. However, the time between an inverter controller recognizing an overload situation ($t_2$) and when the short circuit current exceeds a maximum rated current ($t_3$) is often less time than an individual IGBT requires to switch off. Therefore, the fault current enters a forbidden region for switch shut-off before the controller can act, or before a switch commanded to shut-off actually does shut-off.

One way to slow the rise time down further is artificially increase inductance at the output of the inverter bridge. However, this increases losses and does not address the situation when the inductance itself is part of the short-circuit.

Once the fault current enters the forbidden region for switch shut-off, safe shut off is only possible if the current thereafter decreases below the maximum rated current ($I_{max}$) of the IGBT, or when the current exceeds the required current to desaturate the IGBT. However, once an IGBT reaches desaturation current levels under a fault condition ($t_4$), there is very little time to turn off the switch before there is thermal damage to the IGBT.

To date, in conventional designs, there is always a fault current inductance that will cause any inverter bridge to risk destruction when commanding the IGBTs to an off-state during a Type II fault. Moreover, with conventional inverter bridges, even when the inverter bridge controller commands switches off in a proper sequence, since desaturation ordinarily occurs randomly among the switches in series, destruction of the switches may nonetheless occur.

SUMMARY OF THE INVENTION

The invention is a new design for the protection of Insulated Gate Bipolar Transistors (IGBTs) in an inverter bridge in the case of short-circuit, including type II faults. Transistors experiencing a Type II fault turn off quickly. The principles of the invention hold true for any AC drive—low, medium or high voltage—from any manufacturer. Additionally, the principles hold true when the inverter bridge switches are other types of transistors which experience desaturation under fault conditions, such as bipolar junction transistors (BJTs) and field effect transistors (FETs).

A first aspect of the invention is controlling a transconductance of each switch in the inverter bridge according to the IGBT's position in the inverter bridge topology. The second aspect of the invention is to assign a well-defined excitation control signal to each IGBT according to the IGBT's position in the inverter bridge topology.

In a three-phase inverter bridge, switches are arranged into branches, each branch providing one phase of the three-phase output. Within each branch, switches are further divided into two one-half branches. A first one-half branch comprises one-half of the IGBT's in each branch, connected between a most-positive bus voltage level (positive voltage rail) and the phase output. A second one-half of the IGBTs in each branch are connected between a most-negative bus voltage level (negative voltage rail) and the phase output. IGBT switches toward one of these power rails are referred to as "outer" switches, whereas IGBT switches toward the phase output are referred to as "inner" switches.

When shutting off switches, whether under normal operating conditions or fault conditions, it is essential to shut off switches in each half branch sequentially from outer to inner, as is known in the art. The present invention facilitates safe shutting off of outer switches by assuring that the outer switches always desaturate and shut-off first.

In the embodiments of the invention, a conventional inverter bridge topology is employed. A three-phase multiple-level inverter bridge has three branches, each branch providing one phase of the three-phase output for driving an inductive load. The multiple-level inverter bridge has "L" bus voltage levels (L≧3), wherein two of the L levels are a most-negative bus voltage and a most-positive bus voltage, any intermediate bus voltage levels being differentiated from other bus voltage levels by:

$$\frac{V_{MostPositive} - V_{MostNegative}}{(L-1)}$$

Figure 2:
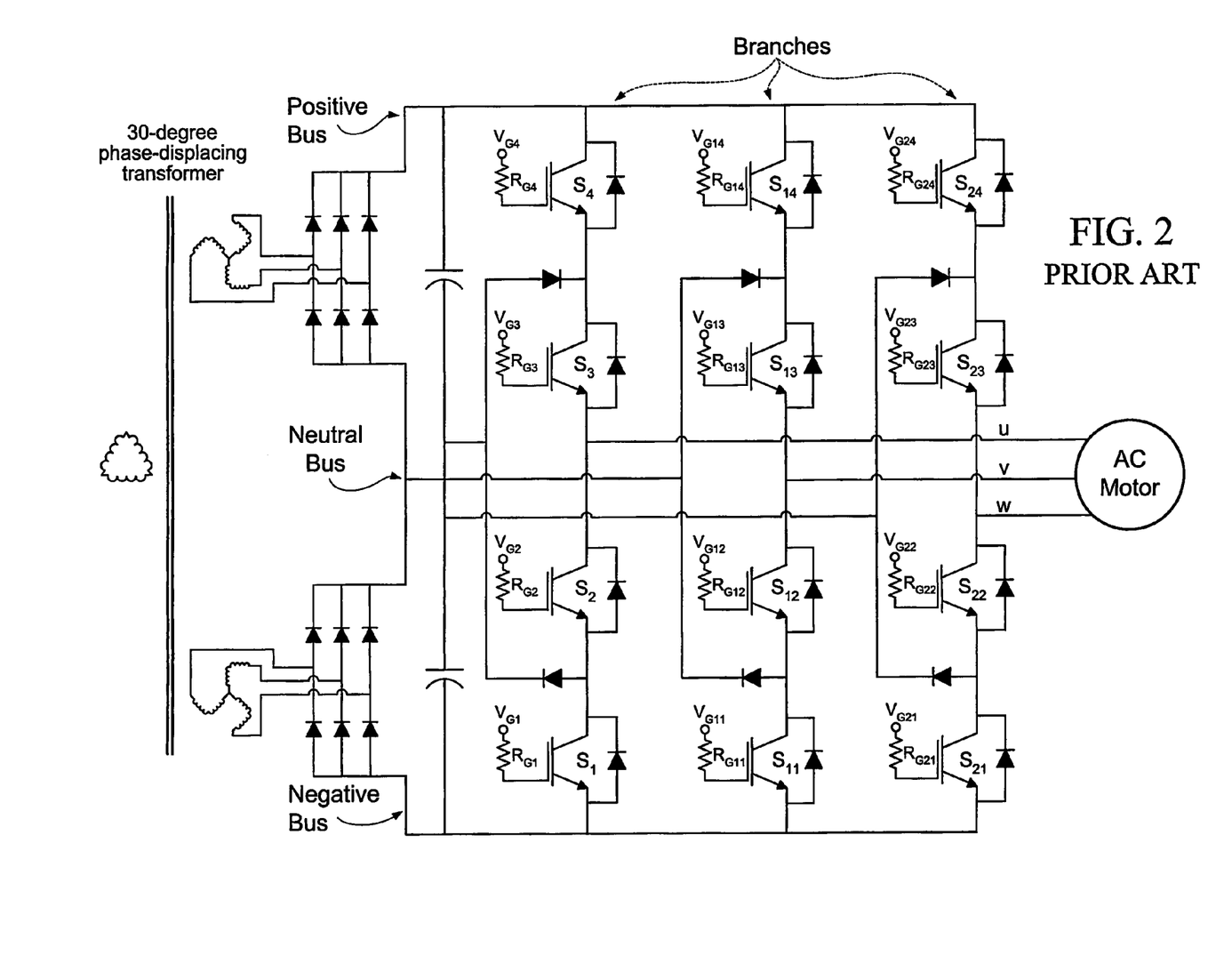
FIG. 2 illustrates an exemplary three-level inverter bridge circuit having an AC motor as the inductive load.
Figure 3:
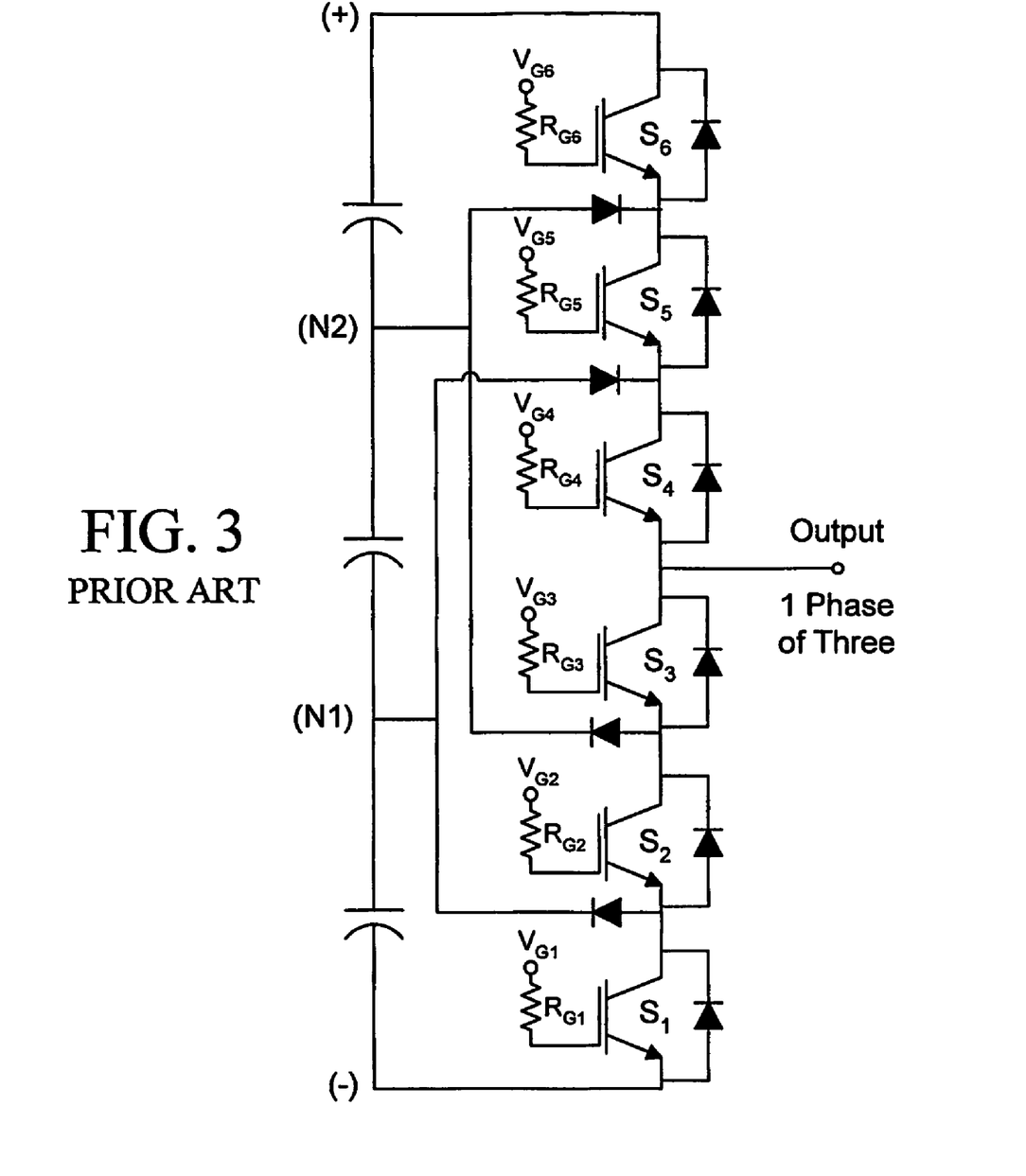
FIG. 3 illustrates a single branch of a four-level inverter bridge.
Figure 4:
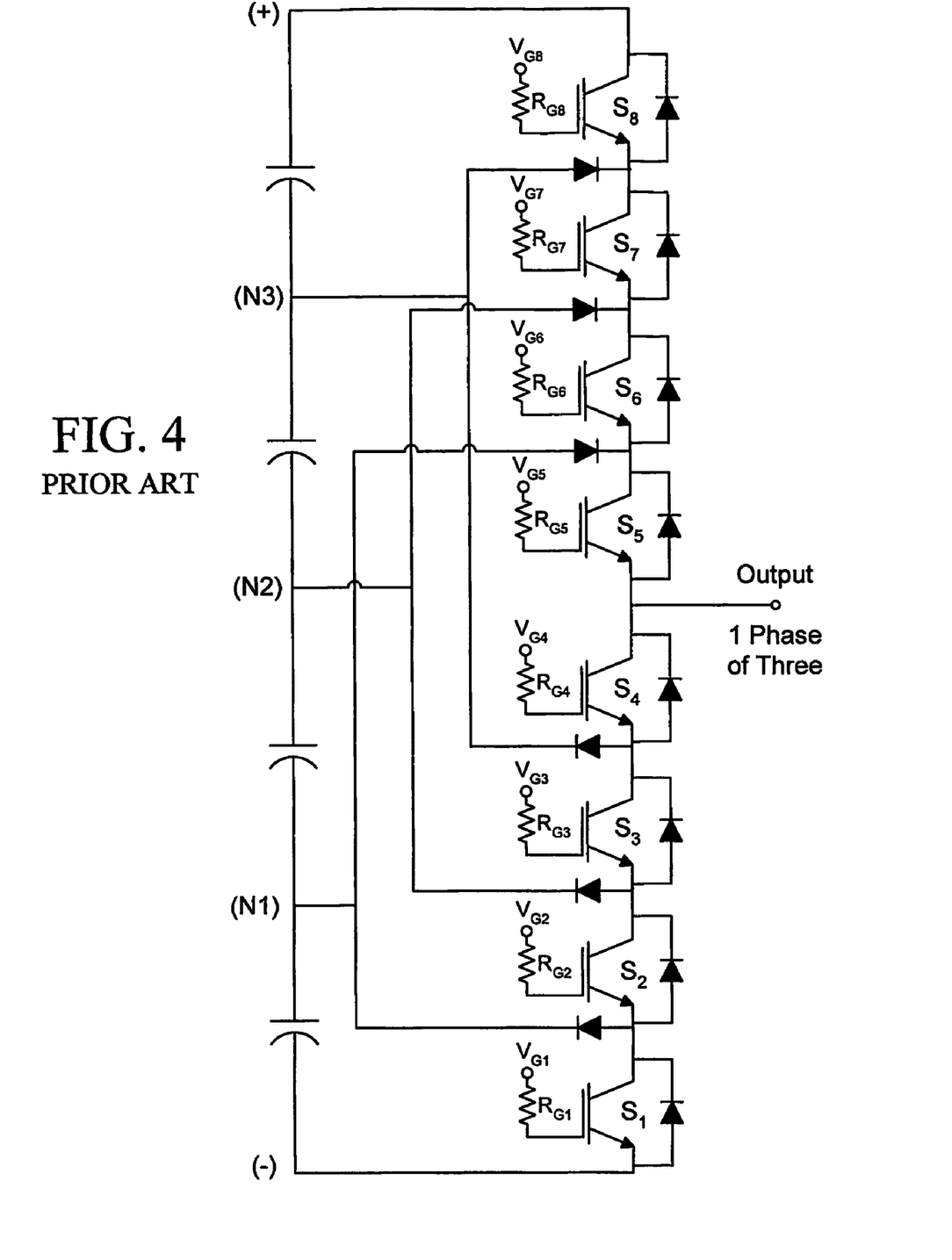
FIG. 4 illustrates a single branch of a five-level inverter bridge.

Illustration of a three-level (L=3) inverter bridge topology is presented in FIG. 2, with single branches of a four-level (L=4) inverter bridge topology and a five-level (L=5) inverter bridge topology being presented in FIGS. 3 and 4.

Each branch of the inverter bridge comprises two half-branches, a first one-half branch comprising (L−1) switches connected in series between the most-positive bus voltage and the phase output, and a second one-half branch comprising (L−1) switches connected in series between the most-negative bus voltage and the phase output.

Further, each half branch comprises an outermost switch of the (L−1) switches which is the switch connected to the most-positive bus voltage or the most-negative bus voltage, and an innermost switch of the (L−1) switches which is the switch connected to the phase output.

If intermediate switches are included in each half-branch (if L>3), such switches which number (L−3) per half branch, and are connected in series between the innermost switch and the outermost switch.

Figure 5:
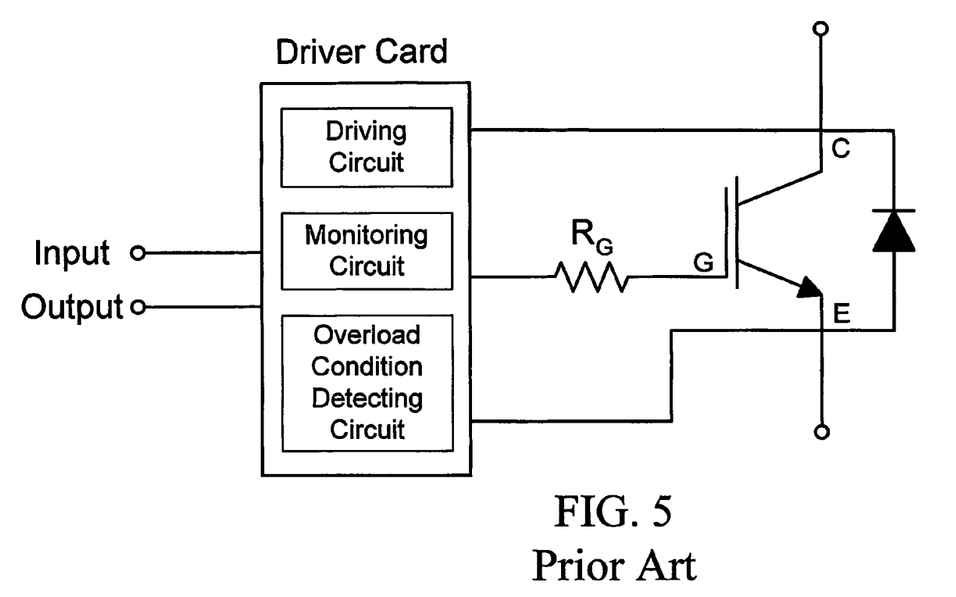
FIG. 5 illustrates a driver card connected to an IGBT.
Figure 6:
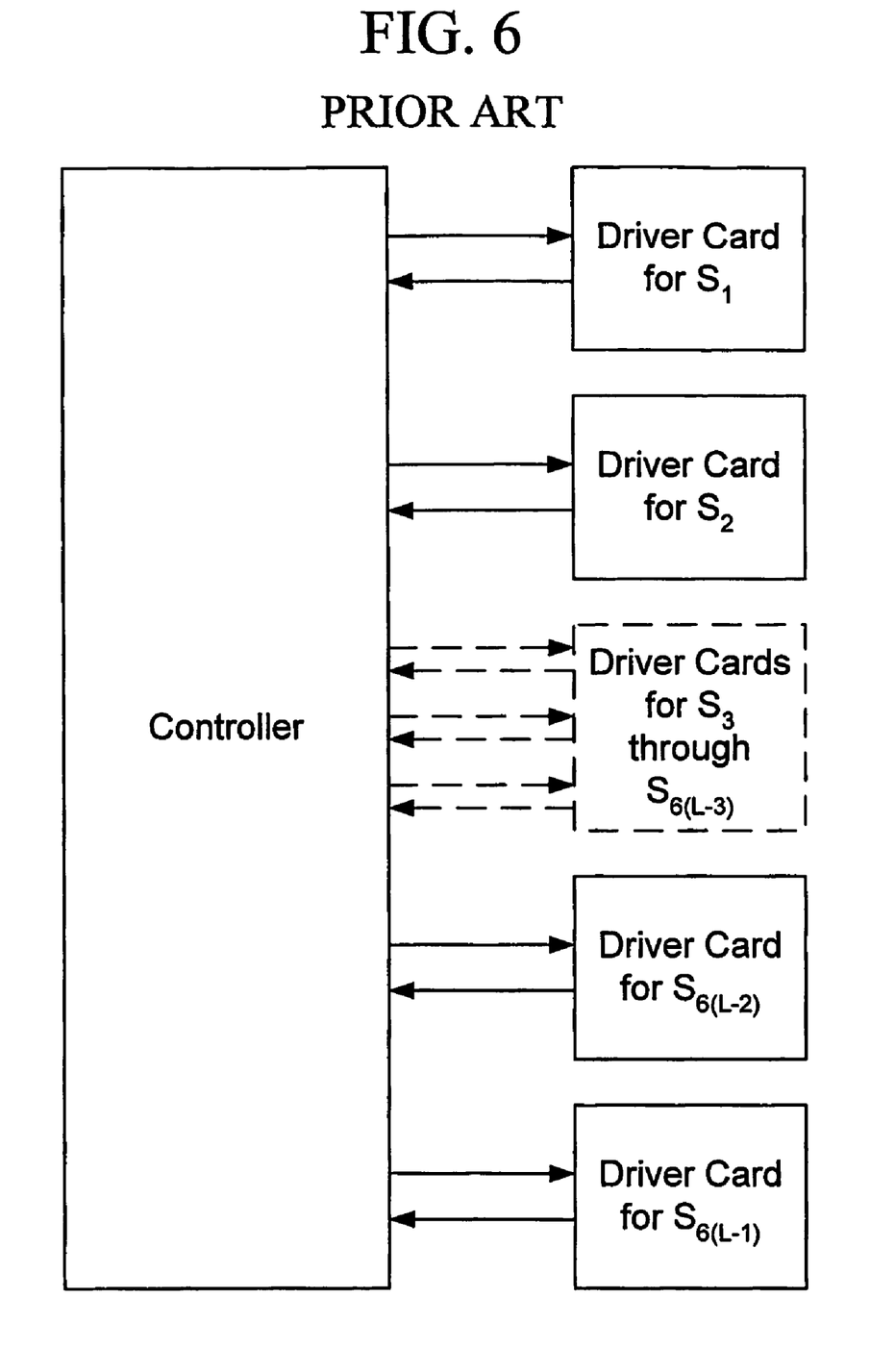
FIG. 6 illustrates a controller interfacing with driver cards.

Additionally, a plurality of driver cards is utilized. Each driver card includes a driving circuit to drive a switch of the inverter bridge, each of the inverter bridge switches having its own driver card as illustrated in FIG. 5. Each driving circuit provides an excitation control signal driving the respective switch to an on-state or an off-state. As examples of excitation control signals, if an embodiment utilizes IGBTs as switches, each excitation control signal is a voltage applied between a gate and an emitter of a respective IGBT; if the switches are FETs, each excitation control signal is a voltage applied between a gate and a source of a respective FET; and if the switches are BJTs, each excitation control signal is a current applied between a base and an emitter of a respective BJT.

The driver cards preferably each include a monitoring circuit, monitoring either a voltage across a respective switch in an on-state or a current through a respective switch in an on-state. For example, if an embodiment utilizes IGBTs, FETs, or BJTs as inverter switches, each monitoring circuit monitors a voltage across a respective switch in an on-state. In comparison, if an embodiment utilizes SCRs, IGCTs, GTOs, or MCTs as inverter switches, each monitoring circuit monitors a current through the respective switch in an on-state.

Also, the driver cards preferably each include an overload condition detecting circuit, detecting an overload condition by comparing the monitored voltage or current of the respective switch in the on-state with a threshold level.

A conventional three-phase multiple-level inverter controller is used to command each driving circuit when to output an excitation control signal to drive a respective switch an on-state or an off-state.

As a first embodiment of the invention, switches for the inverter bridge are selected from those types having a transconductance. Each outermost switch has a lower transconductance than a transconductance of the innermost switch of the same half branch. If L>3, each intermediate switch of a half branch has a transconductance that is no greater than that of an inner next switch in the series, connected toward the phase output, and is no less than that of an outer next switch in the series, connected toward the most-negative bus voltage or the most-positive bus voltage.

Preferably, each intermediate switch of a half branch has a transconductance that is less than that of an inner next switch in the series, connected toward the phase output, and is greater than that of an outer next switch in the series, connected toward the most-negative bus voltage or the most-positive bus voltage.

As the switches of the first embodiment having transconductance, preferable embodiments include insulated gate bipolar transistors (IGBTs), field effect transistor (FETs), and bipolar junction transistor (BJTs).

As a second embodiment of the invention, a method is disclosed for selecting switches for the inverter bridge based upon transconductance. Transconductances of at least 6(L−1) switches are determined. For each half branch of the inverter bridge, an outer switch and an inner switch are selected so that a switch determined as having a lower transconductance is selected for use as an outermost switch, and a switch determined as having a higher transconductance is selected for use as an innermost switch.

If the inverter bridge for which switches are selected has more than three levels (if L>3), intermediate switches are also selected. At the very least, each intermediate switch is selected so that a transconductance of the respective intermediate switch is no greater than that selected for an inner next switch (connected toward the phase output), and is no less than that selected for an outer next switch (connected toward the most-negative bus voltage or the most-positive bus voltage). Preferably, each intermediate switch is selected to have a transconductance that is less than that selected for an inner next switch, and is greater than that selected for an outer next switch.

Preferably, an outer switch is matched to an outer-switch driving circuit configured to provide a first excitation control signal to drive the outer switch to an on-state or an off-state, and an inner switch to an inner-switch driving circuit configured to provide a second excitation control signal to drive the inner switch to an on-state or an off-state. The outer-switch driving circuit and the inner-switch driving circuit are selected or set so that the first excitation control signal, when driving the outer switch to an on-state, is smaller in magnitude than the second excitation control signal, when driving the inner switch to an on-state.

If L>3, then for each intermediate switch within a respective half branch, the intermediate switch is matched to a respective intermediate-switch driving circuit configured to provide an intermediate excitation control signal to drive the intermediate switch to an on-state or an off-state. Each intermediate-switch driving circuit is selected or set so that when driving the intermediate switch to an on-state, the intermediate excitation control signal is no greater in magnitude than that of an excitation control signal used to drive the respective inner next switch to an on-state, and is no less than that of an excitation control signal used to drive the respective outer-next switch to an on-state. More preferably, each intermediate-switch driving circuit is selected or set so that when driving the intermediate switch to an on-state, the intermediate excitation control signal is less in magnitude than that of an excitation control signal used to drive the respective inner next switch to an on-state, and is greater than that of an excitation control signal used to drive the respective outer-next switch to an on-state.

Additionally, for each one half branch, after selecting the inner switch, the outer switch, and any intermediate switches, the switches can be labeled to designate their relative position in a respective one half branch.

As the switches of the second embodiment having transconductance, preferable embodiments include insulated gate bipolar transistors (IGBTs), field effect transistors (FETs), and bipolar junction transistors (BJTs).

A third embodiment of the invention is a system comprising a three-phase multiple-level (L≧3) inverter bridge and the associated driving circuits. Each outermost switch of each half branch is driven to an on-state by a lower-magnitude excitation control signal, than a magnitude of an excitation control signal used to drive an innermost switch of the same half branch to an on-state. If L>3, each intermediate switch of a half branch is driven to an on-state by an excitation control signal that is no greater in magnitude than that of an excitation control signal used to drive an inner next switch connected toward the phase output to an on-state, and is no less than that of an excitation control signal used to drive an outer next switch connected toward the most-negative bus voltage or the most-positive bus voltage to an on-state.

As the switches of the third embodiment having transconductance, preferable embodiments include insulated gate bipolar transistors (IGBTs), field effect transistors (FETs), and bipolar junction transistors (BJTs).

As a first variation of the third embodiment, for each half branch, each switch of the (L−1) switches has a transconductance. Each outermost switch has a lower transconductance than a transconductance of the innermost switch of the same half branch. If L>3, each intermediate switch of a half branch has a transconductance that is less than that of an inner next switch connected toward the phase output, and is greater than that of an outer next switch connected toward the most-negative bus voltage or the most-positive bus voltage.

As a second variation of the third embodiment, if L>3, each intermediate switch of a half branch is driven to an on-state by an excitation control signal that is less in magnitude than that of an excitation control signal used to drive an inner next switch connected toward the phase output to an on-state, and is greater than that of an excitation control signal used to drive an outer next switch connected toward the most-negative bus voltage or the most-positive bus voltage to an on-state.

Preferably, with this second variation, each of the (L−1) switches has a transconductance, and each outermost switch has a lower transconductance than a transconductance of the innermost switch of the same half branch. If L>3, each intermediate switch of a half branch has a transconductance that is no greater than (or more preferably, less than) that of a inner next switch connected toward the phase output, and is no less than (or more preferably, greater than) that of an outer next switch connected toward the most-negative bus voltage or the most-positive bus voltage.

A fourth embodiment of the invention is a system comprising a three-phase multiple-level (L≧3) inverter controller, a three-phase multiple-level inverter bridge, and associated driving circuits, monitoring circuits, and overload condition detecting circuits.

As the switches of the fourth embodiment, examples include insulated gate bipolar transistors (IGBTs), field effect transistors (FETs), bipolar junction transistors (BJTs), silicon controlled rectifiers (SCRs), insulated gate control thyristors (IGCTs), gate turn-off thyristors (GTOs), and metal-oxide silicon controlled thyristors (MCTs).

Each driving circuit providing the excitation control signal to a respective outermost switch, upon detection of an overload condition of the respective outermost switch, automatically drives the respective outermost switch to an off-state, and the overload detecting circuit of the respective outermost switch signals to the three-phase multiple-level inverter controller that the overload condition has been detected.

Each overload detecting circuit of a respective innermost switch, upon detection of an overload condition of the respective innermost switch, signals to the three-phase multiple-level inverter controller that the overload condition has been detected, and the driving circuit providing the excitation control signal to the respective innermost switch waits for instructions from the three-phase multiple-level inverter controller as to whether to leave the innermost switch in an on-state or to drive the innermost switch to an off-state.

Preferably, if L>3, each overload detecting driving circuit of a respective intermediate switch, upon detection of an overload condition of the respective intermediate switch, signals to the three-phase multiple level inverter controller that the overload condition has been detected, and the driving circuit providing the excitation control signal to the respective intermediate switch waits for instructions from the three-phase multiple-level inverter controller as to whether to leave the intermediate switch in an on-state or to drive the intermediate switch to an off-state.

Alternatively, if L>3, each driving circuit providing the excitation control signal to a respective intermediate switch, upon detection of an overload condition of the respective intermediate switch, automatically drives the respective intermediate switch to an off-state, and the overload detecting circuit of the respective intermediate switch signals to the three-phase multiple-level inverter controller that the overload condition has been detected. Each outermost switch of a half branch is driven to an on-state by a lower-magnitude excitation control signal than a magnitude of an excitation control signal used to drive an innermost switch of the same half branch to an on-state. Each intermediate switch of a half branch is driven to an on-state by an excitation control signal that is smaller in magnitude than that excitation control signal used to drive closed an inner next switch connected toward the phase output, and is greater in magnitude than that excitation control signal used to drive closed an outer next switch connected toward the most-negative bus voltage or the most-positive bus voltage.

Further, utilizing switches of a type having transconductance, each outermost switch has a lower transconductance than a transconductance of the innermost switch of the same half branch. Each intermediate switch of a half branch has a transconductance that is less than that of a inner next switch connected toward the phase output, and is greater than that of an outer next switch connected toward the most-negative bus voltage or the most-positive bus voltage.

These above various aspect of the invention mitigate damage from Type I and Type II faults by reliably assuring that outer switches of the inverter bridge will desaturate first, thereby guaranteeing that a switching-off of the switches occurs in the necessary and proper sequence, without requiring a specialized inverter controller.

While using lower transconductance and/or lower magnitude excitation control signals for outer switches is beneficial, the overall benefits achieved would not be the same if similar values were applied to inner switches, since safe shutting off of the inverter bridge depends upon shutting off each half-branch sequentially from the outermost transistor to the innermost transistor. Each switch is designed to handle only a percentage of the bus voltage, and by switching off an inner transistor before an outer transistor, the whole of the bus voltage may be placed across the shut-off inner transistor. Because of the position of the inner transistor in the topology, this results in the destruction of the inner transistor.

DETAILED DESCRIPTION OF EXEMPLARY EMBODIMENTS

In the present disclosure, in the context of switching, the terms "on-state," "conducting," and "closed" are interchangeable, as are the terms "off-state," "non-conducting," and "open".

An aspect of the invention is using IGBTs having lower transconductance values ($g_m$) for the outer switches relative to the transconductance values of the inner switches. By using lower transconductance IGBTs for the outer switches, the outer switches will always desaturate before the inner switches, even when equivalent $+V_{GE}$ levels and ordinary inverter bridge controllers are used.

Several techniques are known in the art for determining transconductance. For example, with IGBTs, an easy way to screen for the transconductance of each IGBT is by measuring the collector-to-emitter voltage drop at rated IGBT current and with $+V_{GE}$ equal to 15V. Another way to screen for transconductance is to create a short-circuit Type I fault and measure the current though the switch: the higher the transconductance, the higher the current for a given $+V_{GE}$. Additionally, in view of the high cost of many IGBTs, some manufacturers may be willing to measure transconductance and label each IGBT accordingly, prior to shipping.

Figure 7A:
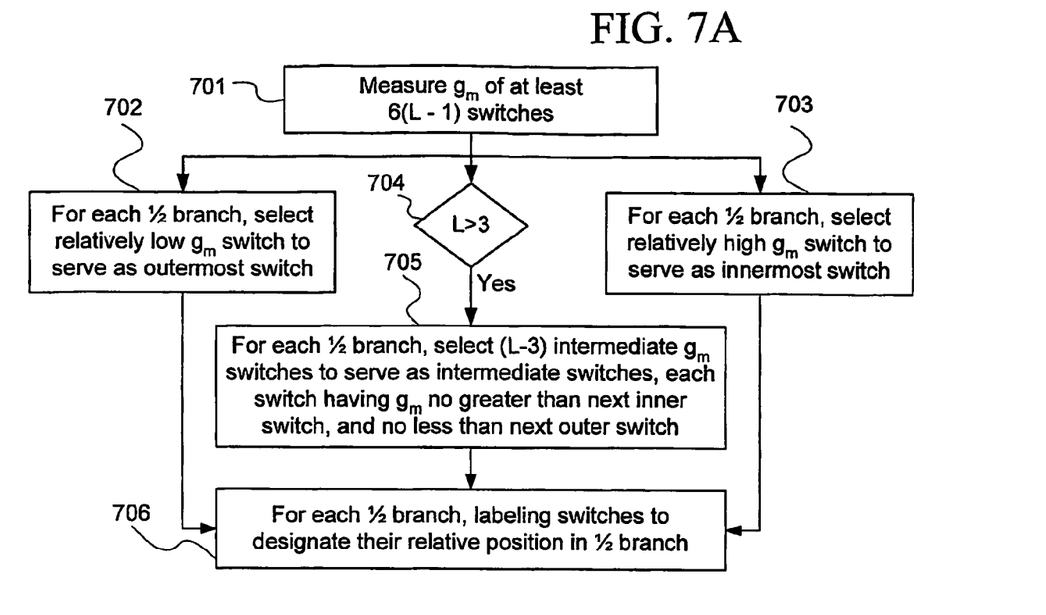
FIGS. 7A and 7B illustrate methods of the invention for preparing switches for the inverter bridge based upon a transconductance of each switch.
Figure 7B:
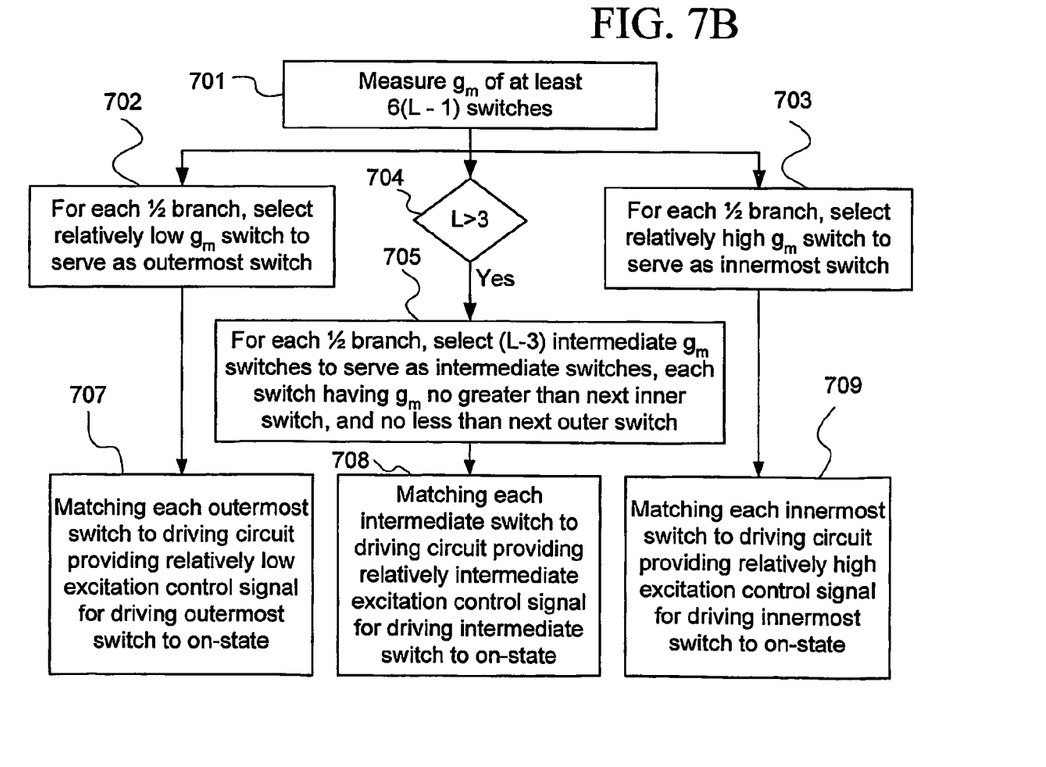

Referring to FIGS. 7A and 7B, in order to construct an inverter bridge with the necessary transconductance arrangement, the $g_m$ of at least 6(L−1) switches needs to be determined (step 701). For each half branch, a relatively low $g_m$ switch is selected to serve as an outermost switch (step 702), whereas a relatively high $g_m$ switch (relatively high within the same half branch) is selected to serve as an innermost switch (step 703). If L>3 (step 704), then (L−3) switches are selected to serve as intermediate switches for a branch, to be connected in series between the outermost and innermost switches. Each intermediate switch has a $g_m$ no greater than the next inner switch, and no less than the next outer switch (step 705). Preferably, each intermediate switch has a $g_m$ less than the next inner switch, and greater than the next outer switch.

For example, in FIG. 4, the second half branch comprises switches $S_1$ to $S_4$, $S_1$ being the outermost switch, and $S_4$ being the innermost switch. Each switch $S_N$ has a transconductance of $g_{mN}$. In accordance with the method of FIG. 7, the transconductances of this branch must satisfy:

$$g_{m1} < g_{m4} \text{ and } g_{m1} \leq g_{m2} \leq g_{m3} \text{ and } g_{m2} \leq g_{m3} \leq g_{m4}$$

More preferably, the transconductances satisfy:

$$g_{m1} < g_{m2} < g_{m3} < g_{m4}$$

Additionally, for each one half branch, after selecting the inner switch, the outer switch, and any intermediate switches, the switches can be labeled to designate their relative position in a respective one-half branch (step 706).

By arranging the transistors in this manner, when a short circuit occurs, the upper current limit at which desaturation occurs ($I_{SC}$) is lowered, so that a transistor having a lower transconductance will necessarily desaturate first. Therefore, switch sequencing necessary for a safe switching off of a half branch is assured, even with an ordinary controller.

Likewise, lowering the excitation used to drive the transistor to an on-state also results in earlier desaturation. For example, referring to an IGBT, a lower $+V_{GE}$ has a similar effect to using an IGBT with lower transconductance.

In general, driver cards for IGBT transistors utilize a $+V_{GE}=15V$ for on-state. According to an aspect of the invention, each innermost transistor is kept at $+V_{GE}=15V$, whereas a lower voltage is used to excite the outermost transistor. If it is necessary to accommodate a tolerance of the $+V_{GE}$ utilized to excite the on-state of the innermost transistor, it is best if $+V_{GE}$ is equal to 15V +0.5V/−0.0V (that is, varying away from the $+V_{GE}$ used for the outer transistors) because the inner IGBT must not desaturate before the outer IGBT does.

Reducing $+V_{GE}$ from 15V to 14V effectively reduces the maximum current ($I_{SC}$) that will pass through the IGBT. For example, a 600 A, 6.5 kV IGBT, $I_{SC}$ in the event of a short-circuit is reduced from 3,600 A to 3,000 A. Therefore, by driving an outer transistor with $+V_{GE}=14V$, while driving an inner transistor with $+V_{GE}=15V$, the outer IGBT will always desaturate before the corresponding inner IGBT does because its $I_{SC}$ is smaller.

Referring again to the second half branch comprises switches $S_1$ to $S_4$ in FIG. 4, for a $+V_{GE\,N}$ applied to a switch $S_N$, it is preferable that:

$$+V_{GE1} < +V_{GE4} \text{ and } +V_{GE1} \leq +V_{GE2} \leq +V_{GE3}$$
$$\text{and } +V_{GE2} \leq +V_{GE3} \leq +V_{GE4}$$

More preferably, the excitation signals satisfy:

$$+V_{GE1} < +V_{GE2} < +V_{GE3} < +V_{GE4}$$

When reducing $+V_{GE}$, the value of the corresponding $R_G$ should be adjusted down so that the switching losses associated with lowering $+V_{GE}$ can be minimized. Within reasonable values, this can result in a slight increase in conduction losses due to the increase of collector to emitter voltage, but with negligible effects on the thermal losses.

Moreover, if transconductance is not determined, and a device with higher transconductance was used for an outer switch, the higher transconductance value could offset any benefit gained by the lowering of the $+V_{GE}$ to, for example, from +15V to +14V. Accordingly, to assure benefits from lowering $+V_{GE}$ for outer transistors, the transistors utilized should have, at the very least, like transconductances. Preferably, however, both lower transconductance and lower $+V_{GE}$ are used together, thereby assuring the proper desaturation sequence.

For example, as illustrated in FIG. 7B, each switch of a half branch having sequentially arranged tranconductances can be matched to a driving circuit selected or set to drive each switch as described above. Each outer switch, having a relatively low transconductance, is matched to a driving circuit configured to provide a relatively low $+V_{GE}$ when driving the outer switch to an on-state (step 707), whereas each inner switch, having a relatively high transconductance, is matched to a driving circuit configured to provide a relatively high $+V_{GE}$ when driving the inner switch to an on-state (step 709). Each intermediate switch, having an intermediate transconductance, is matched to a respective driving circuit configured to provide a relatively intermediate $+V_{GE}$ when driving the intermediate switch to an on-state (step 708), each intermediate $+V_{GE}$ being no greater in magnitude than a $+V_{GE}$ used to drive the respective next inner switch to an on-state, and being no less in magnitude than a $+V_{GE}$ used to drive the respective next outer switch to an on-state. More preferably, each intermediate $+V_{GE}$ is lesser in magnitude than the $+V_{GE}$ used to drive the respective next inner switch to an on-state, and is greater in magnitude than the $+V_{GE}$ used to drive the respective next outer switch to an on-state.

A further aspect of the invention is utilizing driver cards for outer switches that are set to automatically shut off the outer switch when an overload condition is detected, without waiting for instructions from the controller. Such a setting is sometimes referred to in the art as "two-level" control. By utilizing two-level control, as soon as a desaturation voltage value per switch, or a maximum rated short circuit current ($I_{sc}$) per switch are detected, the driver card itself will turn the outer switch off and send a fault signal via to the controller via an interface such as an optical fiber. This driver card process is more effective because the driver card responds faster than the controller in most circumstances.

In comparison, the driver cards driving the inner switches are set to report detection of an overload condition to the controller, and wait for instructions. Such a setting is sometimes referred to in the art as "three level" control. By utilizing three-level control, the inner switches are turned-off only by a sequenced command from the controller. This is important because an innermost switch must not be turned-off before the corresponding outer-most switch is turned-off.

In fact, if the outer switch is appropriately turned-off, then the corresponding inner switch does not necessarily have to be turned-off at all, which will help to quench the energy stored in the magnetic field of both the load inductance and the stray inductance of the output cable. The controller will turn off the inner switch if it concludes that the corresponding outer switch is shorted.

Intermediate switch driver cards should also report detection of an overload condition to the controller, and wait for instructions. However, if transconductances and/or excitation control signals are selected in accordance with the other aspects of the invention, intermediate switch driver cards can also be set to automatically command a respective intermediate switch to turn off.

It is contemplated that numerous modifications may be made to the embodiments and implementations of the present invention without departing from the spirit and scope of the invention as defined in the following claims.

What is claimed is:

1. A three-phase multiple-level inverter bridge having three branches, each branch providing one phase of the three-phase output for driving an inductive load, the multiple-level inverter bridge having "L" bus voltage levels (L≧3), wherein two of the L levels are a most-negative bus voltage and a most-positive bus voltage, any intermediate bus voltage levels being differentiated from other bus voltage levels by a difference of the most-positive bus voltage and the most-negative bus voltage, divided by (L−1),
    each branch comprising two half-branches, a first one-half branch comprising (L−1) switches connected in series between the most-positive bus voltage and the phase output, and a second one-half branch comprising (L−1) switches connected in series between the most-negative bus voltage and the phase output,
    each half branch comprising:
        an outermost switch of the (L−1) switches which is the switch connected to the most-positive bus voltage or the most-negative bus voltage;
        an innermost switch of the (L−1) switches which is the switch connected to the phase output; and
        if L>3, (L−3) intermediate switches of the (L−1) switches connected in series between the innermost switch and the outermost switch,
    wherein:
        each of the (L−1) switches has a transconductance, and is configured to be driven by a control signal, and
        each outermost switch has a lower transconductance than a transconductance of the innermost switch of the same half branch, and
        if L>3, each intermediate switch of a half branch has a transconductance that is no greater than that of an inner next switch in the series, connected toward the phase output, and is no less than that of an outer next switch in the series, connected toward the most-negative bus voltage or the most-positive bus voltage.

2. A three-phase multiple-level inverter bridge according to claim 1, wherein each intermediate switch of a half branch has a transconductance that is less than that of an inner next switch in the series, connected toward the phase output, and is greater than that of an outer next switch in the series, connected toward the most-negative bus voltage or the most-positive bus voltage.

3. A three-phase multiple-level inverter bridge according to claim 1, wherein each switch of the (L−1) switches is selected from the group consisting of a insulated gate bipolar transistor (IGBT), a field effect transistor (FET), and a bipolar junction transistor (BJT).

4. A method of preparing switches for a three-phase multiple-level inverter bridge having three branches, each branch providing one phase of the three-phase output for driving an inductive load, the multiple-level inverter bridge having "L" bus voltage levels (L≧3), wherein two of the L levels are a most-negative bus voltage and a most-positive bus voltage, any intermediate bus voltage levels being differentiated from other bus voltage levels by a difference of the most-positive bus voltage and the most-negative bus voltage, divided by (L−1),
    each branch comprising two half-branches, a first one-half branch comprising (L−1) switches connected in series between the most-positive bus voltage and the phase output, and a second one-half branch comprising (L−1)

switches connected in series between the most-negative bus voltage and the phase output, each half branch having an outermost switch of the (L−1) switches which is the switch connected to the most-positive bus voltage or the most-negative bus voltage, each half branch having an innermost switch of the (L−1) switches which is the switch connected to the phase output, each of the (L−1) switches having a transconductance, and configured to be driven by a control signal, and each outermost switch having a lower transconductance than a transconductance of the innermost switch of the same half branch, wherein if L>3, there are (L−3) intermediate switches of the (L−1) switches connected in series between the innermost switch and the outermost switch, each intermediate switch of a half branch having a transconductance that is no greater than that of a inner next switch in the series, connected toward the phase output, and is no less than that of an outer next switch in the series, connected toward the most-negative bus voltage or the most-positive bus voltage, the method comprising:
  determining the transconductance of at least 6(L−1) switches;
  selecting, for each half branch, an outer switch and an inner switch, so that said outer switch has a lower transconductance than said inner switch; and
  selecting, if L>3, for each half branch, each intermediate switch so that a transconductance of the respective intermediate switch is no greater than that of an inner next switch to be connected toward the phase output, and is no less than that of an outer next switch to be connected toward the most-negative bus voltage or the most-positive bus voltage.

5. A method according to claim 4, further comprising:
for each one-half branch, after selecting the inner switch, the outer switch, and if L>3, any intermediate switches, labeling the switches to designate their relative position in the respective one half branch.

6. A method according to claim 4, wherein selecting each intermediate switch further comprises selecting each intermediate switch of a half branch to have a transconductance that is less than that of an inner next switch to be connected toward the phase output, and is greater than that of an outer next switch to be connected toward the most-negative bus voltage or the most-positive bus voltage.

7. A method according to claim 6, further comprising:
for each one half branch, after selecting the inner switch, the outer switch, and if L>3, any intermediate switches, labeling the switches to designate their relative position in the respective one half branch.

8. A method according to claim 6, further comprising:
matching, for each half branch, an outer switch to an outer-switch driving circuit configured to provide a first excitation control signal to drive the outer switch to an on-state or an off-state;
matching, for each half branch, an inner switch to an inner-switch driving circuit configured to provide a second excitation control signal to drive the inner switch to an on-state or an off-state,
wherein the outer-switch driving circuit and the inner-switch driving circuit are selected or set so that said first excitation control signal, when driving the outer switch to an on-state, is smaller in magnitude than said second excitation control signal, when driving the inner switch to an on-state; and
if L>3, then for each half branch and for each intermediate switch within the respective half branch, matching the intermediate switch to a respective intermediate-switch driving circuit configured to provide an intermediate excitation control signal to drive the intermediate switch to an on-state or an off-state, wherein each intermediate-switch driving circuit is selected or set so that when driving the intermediate switch to an on-state, the intermediate excitation control signal is no greater in magnitude than that of an excitation control signal used to drive the respective inner next switch to an on-state, and is no less than that of an excitation control signal used to drive the respective outer-next switch to an on-state.

9. A method according to claim 4, further comprising:
matching, for each half branch, an outer switch to an outer-switch driving circuit configured to provide a first excitation control signal to drive the outer switch to an on-state or an off-state;
matching, for each half branch, an inner switch to an inner-switch driving circuit configured to provide a second excitation control signal to drive the inner switch to an on-state or an off-state,
wherein the outer-switch driving circuit and the inner-switch driving circuit are selected or set so that said first excitation control signal, when driving the outer switch to an on-state, is smaller in magnitude than said second excitation control signal, when driving the inner switch to an on-state; and
if L>3, then for each half branch and for each intermediate switch within the respective half branch, matching the intermediate switch to a respective intermediate-switch driving circuit configured to provide an intermediate excitation control signal to drive the intermediate switch to an on-state or an off-state, wherein each intermediate-switch driving circuit is selected or set so that when driving the intermediate switch to an on-state, the intermediate excitation control signal is less in magnitude than that of an excitation control signal used to drive the respective inner next switch to an on-state, and is greater than that of an excitation control signal used to drive the respective outer-next switch to an on-state.

10. A method according to claim 4, wherein each selected innermost, outermost, and intermediate switch is selected from the group consisting of a insulated gate bipolar transistor (IGBT), a field effect transistor (FET), and a bipolar junction transistor (BJT).

11. A system comprising:
a three-phase multiple-level inverter bridge having three branches, each branch providing one phase of the three-phase output for driving an inductive load, the multiple-level inverter bridge having "L" bus voltage levels (L≧3), wherein two of the L levels are a most-negative bus voltage and a most-positive bus voltage, any intermediate bus voltage levels being differentiated from other bus voltage levels by a difference of the most-positive bus voltage and the most-negative bus voltage, divided by (L−1),
each branch comprising two half-branches, a first one-half branch comprising (L−1) switches connected in series between the most-positive bus voltage and the phase output, and a second one-half branch comprising (L−1) switches connected in series between the most-negative bus voltage and the phase output, each half branch having an outermost switch of the (L−1) switches which is the switch connected to the most-positive bus voltage or the most-negative bus voltage, each half branch having an innermost switch of the (L−1) switches which is the switch connected to the phase output, wherein if L>3, there are (L−3) intermediate switches of the (L−1) switches connected in series between the innermost switch and the outermost switch, and a plurality of driving circuits configured to drive switches of the inverter bridge, each of the inverter bridge switches having its own driving circuit, and each driving circuit providing an excitation control signal driving the respective switch to an on-state or an off-state, wherein each outermost switch of each half branch is driven to an on-state by a lower-magnitude excitation control signal, than a magnitude of an excitation control signal used to drive an innermost switch of the same half branch to an on-state, wherein, if L>3, each intermediate switch of a half branch is driven to an on-state by an excitation control signal that is no greater in magnitude than that of an excitation control signal used to drive an inner next switch connected toward the phase output to an on-state, and is no less than that of an excitation control signal used to drive an outer next switch connected toward the most-negative bus voltage or the most-positive bus voltage to an on-state.

12. A system of according to claim 11, wherein:
each of the (L−1) switches has a transconductance, and
each outermost switch has a lower transconductance than a transconductance of the innermost switch of the same half branch,
if L>3, each intermediate switch of a half branch has a transconductance that is less than that of an inner next switch connected toward the phase output, and is greater than that of an outer next switch connected toward the most-negative bus voltage or the most-positive bus voltage.

13. A system of according to claim 11, wherein if L>3, each intermediate switch of a half branch is driven to an on-state by an excitation control signal that is less in magnitude than that of an excitation control signal used to drive an inner next switch connected toward the phase output to an on-state, and is greater than that of an excitation control signal used to drive an outer next switch connected toward the most-negative bus voltage or the most-positive bus voltage to an on-state.

14. A system of according to claim 13, wherein:
each of the (L−1) switches has a transconductance, and
each outermost switch has a lower transconductance than a transconductance of the innermost switch of the same half branch,
if L>3, each intermediate switch of a half branch has a transconductance that is no greater than that of a inner next switch connected toward the phase output, and is no less than that of an outer next switch connected toward the most-negative bus voltage or the most-positive bus voltage.

15. A system of according to claim 13, wherein:
each of the (L−1) switches has a transconductance, and
each outermost switch has a lower transconductance than a transconductance of the innermost switch of the same half branch,
if L>3, each intermediate switch of a half branch has a transconductance that is less than that of a inner next switch connected toward the phase output, and is greater than that of an outer next switch connected toward the most-negative bus voltage or the most-positive bus voltage.

16. A system according to claim 11, wherein for each half branch, each switch of the (L−1) switches is selected from the group consisting of a insulated gate bipolar transistor (IGBT), a field effect transistor (FET), and a bipolar junction transistor (BJT),
wherein if the (L−1) switches are IGBTs, each excitation control signal is a voltage applied between a gate and an emitter of a respective IGBT,
wherein if the (L−1) switches are FETs, each excitation control signal is a voltage applied between a gate and a source of a respective FET, and
wherein if the (L−1) switches are BJTs, each excitation control signal is a current applied between a base and an emitter of a respective BJT.

17. A system comprising:
a three-phase multiple-level inverter bridge having three branches, each branch providing one phase of the three-phase output for driving an inductive load, the multiple-level inverter bridge having "L" bus voltage levels (L≧3), wherein two of the L levels are a most-negative bus voltage and a most-positive bus voltage, any intermediate bus voltage levels being differentiated from other bus voltage levels by a difference of the most-positive bus voltage and the most-negative bus voltage, divided by (L−1), each branch comprising two half-branches, a first one-half branch comprising (L−1) switches connected in series between the most-positive bus voltage and the phase output, and a second one-half branch comprising (L−1) switches connected in series between the most-negative bus voltage and the phase output, each half branch having an outermost switch of the (L−1) switches which is the switch connected to the most-positive bus voltage or the most-negative bus voltage, each half branch having an innermost switch of the (L−1) switches which is the switch connected to the phase output, and if L>3, each half branch having (L−3) intermediate switches of the (L−1) switches connected in series between the innermost switch and the outermost switch; and a plurality of driving circuits configured to drive switches of the inverter bridge, each of the inverter bridge switches having its own driving circuit, and each driving circuit providing an excitation control signal driving the respective switch to an on-state or an off-state;

a plurality of monitoring circuits, each of the inverter bridge switches having its own monitoring circuit monitoring either a voltage across a respective switch in an on-state or a current through a respective switch in an on-state;

a plurality of overload condition detecting circuits, each of the inverter bridge switches having its own overload condition detecting circuit, detecting an overload condition by comparing the monitored voltage or current of the respective switch in the on-state with a threshold level;

a three-phase multiple-level inverter controller, commanding each driving circuit when to output an excitation control signal to drive a respective switch an on-state or an off-state;

wherein each driving circuit providing the excitation control signal to a respective outermost switch, upon detection of an overload condition of the respective outermost switch, automatically drives the respective outermost switch to an off-state, and the overload detecting circuit of the respective outermost switch signals to said three-phase multiple-level inverter controller that the overload condition has been detected, wherein each overload detecting circuit of a respective innermost switch, upon detection of an overload condition of the respective innermost switch, signals to said three-phase multiple-level inverter controller that the overload condition has been detected, and the driving circuit providing the excitation control signal to the respective innermost switch waits for instructions from said three-phase multiple-level inverter controller as to whether to leave the innermost switch in an on-state or to drive the innermost switch to an off-state.

18. A system according to claim 17, wherein L>3, and wherein each overload detecting driving circuit of a respective intermediate switch, upon detection of an overload condition of the respective intermediate switch, signals to said three-phase multiple level inverter controller that the overload condition has been detected, and the driving circuit providing the excitation control signal to the respective intermediate switch waits for instructions from said three-phase multiple-level inverter controller as to whether to leave the intermediate switch in an on-state or to drive the intermediate switch to an off-state.

19. A system according to claim 17, wherein L>3, wherein each driving circuit providing the excitation control signal to a respective intermediate switch, upon detection of an overload condition of the respective intermediate switch, automatically drives the respective intermediate switch to an off-state, and the overload detecting circuit of the respective intermediate switch signals to said three-phase multiple-level inverter controller that the overload condition has been detected, wherein each outermost switch of a half branch is driven to an on-state by a lower-magnitude excitation control signal than a magnitude of an excitation control signal used to drive an innermost switch of the same half branch to an on-state, each intermediate switch of a half branch is driven to an on-state by an excitation control signal that is smaller in magnitude than that excitation control signal used to drive an inner next switch connected toward the phase output to an on-state, and is greater in magnitude than that excitation control signal used to drive an outer next switch connected toward the most-negative bus voltage or the most-positive bus voltage to an on-state, each of the (L−1) switches has a transconductance, each outermost switch has a lower transconductance than a transconductance of the innermost switch of the same half branch, and each intermediate switch of a half branch has a transconductance that is less than that of a inner next switch connected toward the phase output, and is greater than that of an outer next switch connected toward the most-negative bus voltage or the most-positive bus voltage.

20. A system according to claim 17, wherein each switch of the (L−1) switches of each half branch is selected from the group consisting of a insulated gate bipolar transistor (IGBT), a field effect transistor (FET), a bipolar junction transistor (BJT), silicon controlled rectifier (SCR), insulated gate control thyristor (IGCT), gate turn-off thyristor (GTO), and metal-oxide silicon controlled thyristor (MCT), wherein if the switches are IGBTs, FETs, or BJTs, each monitoring circuit monitors a voltage across the respective switch in the on-state, and wherein if the switches are SCRs, IGCTs, GTOs, or MCTs, each monitoring circuit monitors a current through the respective switch in the on-state.

21. A system according to claim 20, wherein if the switches are IGBTs, FETS, or BJTs, said threshold level is a desaturation voltage value per switch, and when the monitored voltage in the on-state is above said threshold level, the switch is considered desaturated, thereby indicating the overload condition.

22. A system according to claim 20, wherein if the switches are SCRs, IGCTs, GTOs, or MCTs, said threshold level is a maximum rated short circuit current ($I_{sc}$) per switch, and when the monitored current in the on-state is above said threshold level, the switch is considered desaturated, thereby indicating the overload condition.

* * * * *